US00RE50922E

(19) United States
(12) Reissued Patent
Chang

(10) Patent Number: US RE50,922 E
(45) Date of Reissued Patent: Jun. 16, 2026

(54) GATE DRIVER, ORGANIC LIGHT EMITTING DISPLAY DEVICE INCLUDING THE SAME, AND METHOD FOR OPERATING THE SAME

(71) Applicant: LG Display Co., Ltd., Seoul (KR)

(72) Inventor: Minkyu Chang, Paju-si (KR)

(73) Assignee: LG Display Co., Ltd., Seoul (KR)

(21) Appl. No.: 18/206,870

(22) Filed: Jun. 7, 2023

Related U.S. Patent Documents

Reissue of:
(64) Patent No.: 11,030,958
Issued: Jun. 8, 2021
Appl. No.: 16/667,810
Filed: Oct. 29, 2019

(30) Foreign Application Priority Data

Oct. 30, 2018 (KR) ..... 10-2018-0131241

(51) Int. Cl.
*G09G 3/3258* (2016.01)
*G09G 3/3266* (2016.01)
*G09G 3/3291* (2016.01)

(52) U.S. Cl.
CPC ..... *G09G 3/3258* (2013.01); *G09G 3/3266* (2013.01); *G09G 3/3291* (2013.01)

(58) Field of Classification Search
CPC ..... G09G 3/3258
See application file for complete search history.

(56) References Cited

U.S. PATENT DOCUMENTS 8,405,579 B2 * 3/2013 Choi ..... G09G 3/3283 345/76
9,035,933 B2 * 5/2015 Lin ..... G09G 3/3611 345/211
9,117,512 B2 * 8/2015 Nam ..... G11C 19/28
9,171,503 B2 * 10/2015 Kim ..... G09G 3/3233
9,214,106 B2 * 12/2015 Han ..... G09G 3/2092
9,779,665 B2 * 10/2017 Song ..... G09G 3/3266
9,886,891 B2 * 2/2018 In ..... G09G 3/3275
(Continued)

FOREIGN PATENT DOCUMENTS

CN 101281725 A 10/2008
CN 103123774 A 5/2013
(Continued)

*Primary Examiner* — Cameron Saadat

(74) *Attorney, Agent, or Firm* — Seed Intellectual Property Law Group LLP

(57) ABSTRACT

A gate driver has a plurality of stages for outputting a gate signal for image at a time of display driving and outputting a gate signal for sensing at a time of sensing driving that follows the display driving. Each of the stages includes a pixel line selecting unit charging an M node with a first preceding stage carry signal according to a pixel line selection signal of a gate-on voltage during the display driving and charging a Q node with a first high-potential power supply voltage according to a sensing start signal of a gate-on voltage and a charged voltage of the M node during the sensing driving, and an output unit outputting a scan clock of a gate-on voltage as the gate signal for sensing while the Q node maintains a charged state on the sensing driving, wherein the first high-potential power supply voltage is higher at the time of the sensing driving than at the time of the display driving.

45 Claims, 11 Drawing Sheets

(56) References Cited

U.S. PATENT DOCUMENTS

| | | | | |
|---|---|---|---|---|
| 10,096,286 | B2 * | 10/2018 | Cho | G09G 3/3266 |
| 10,109,239 | B2 * | 10/2018 | In | G09G 3/3266 |
| 10,121,406 | B2 * | 11/2018 | Jang | G09G 3/20 |
| 10,157,683 | B2 * | 12/2018 | Jang | G11C 19/28 |
| 10,198,998 | B2 * | 2/2019 | In | G09G 3/3266 |
| 10,217,410 | B2 * | 2/2019 | Moon | G09G 3/325 |
| 10,217,414 | B2 * | 2/2019 | Park | G09G 3/3258 |
| 10,297,196 | B2 * | 5/2019 | Wu | G09G 3/3233 |
| 10,403,211 | B2 * | 9/2019 | In | G09G 3/3233 |
| 10,418,388 | B2 * | 9/2019 | Kim | G09G 3/3258 |
| 10,482,825 | B2 * | 11/2019 | Kim | G09G 3/3266 |
| 10,522,609 | B2 * | 12/2019 | Woo | H01L 27/323 |
| 10,547,316 | B2 * | 1/2020 | Takasugi | H03K 21/18 |
| 10,672,346 | B2 * | 6/2020 | Kang | H01L 51/5206 |
| 10,699,645 | B2 * | 6/2020 | Bong | G09G 5/10 |
| 2008/0062071 | A1 * | 3/2008 | Jeong | G11C 19/184 345/46 |
| 2011/0292007 | A1 * | 12/2011 | Ohhashi | G11C 19/28 345/204 |
| 2014/0055444 | A1 * | 2/2014 | Jang | G09G 3/3266 345/213 |
| 2014/0085285 | A1 * | 3/2014 | Kim | G11C 19/28 345/211 |
| 2014/0152629 | A1 * | 6/2014 | So | G09G 3/3266 345/205 |
| 2015/0317954 | A1 * | 11/2015 | Jang | G09G 5/18 345/213 |
| 2016/0111044 | A1 * | 4/2016 | Kishi | G09G 3/3233 345/690 |
| 2016/0216820 | A1 | 7/2016 | Sung et al. | |
| 2016/0217728 | A1 | 7/2016 | In et al. | |
| 2016/0240146 | A1 * | 8/2016 | Lee | G09G 3/3291 |
| 2016/0351152 | A1 * | 12/2016 | Dai | H01L 29/7869 |
| 2016/0365035 | A1 * | 12/2016 | Park | G09G 3/3266 |
| 2017/0116926 | A1 * | 4/2017 | Bong | G11C 19/186 |
| 2017/0200418 | A1 * | 7/2017 | Zhang | G11C 19/28 |
| 2018/0024677 | A1 * | 1/2018 | Kim | G09G 3/3233 345/173 |
| 2019/0103049 | A1 * | 4/2019 | Noh | H03K 17/162 |
| 2019/0114013 | A1 * | 4/2019 | Wu | G06F 3/04184 |
| 2019/0189058 | A1 * | 6/2019 | Cho | G09G 3/3258 |
| 2019/0378458 | A1 * | 12/2019 | Lee | H01L 27/3276 |
| 2020/0035182 | A1 * | 1/2020 | Bae | G11C 19/28 |
| 2020/0051496 | A1 * | 2/2020 | Kang | G09G 3/3233 |
| 2020/0066211 | A1 * | 2/2020 | Lee | G09G 3/3275 |
| 2020/0074933 | A1 * | 3/2020 | Ban | G09G 3/3291 |
| 2020/0111421 | A1 * | 4/2020 | Kim | G09G 3/3266 |
| 2020/0168162 | A1 * | 5/2020 | Feng | G09G 3/3266 |
| 2020/0184898 | A1 * | 6/2020 | Choi | G09G 3/3258 |
| 2020/0193912 | A1 * | 6/2020 | Park | G09G 3/3275 |

FOREIGN PATENT DOCUMENTS

| | | | |
|---|---|---|---|
| CN | 103714770 | A | 4/2014 |
| CN | 105261340 | A | 1/2016 |
| CN | 105321459 | A | 2/2016 |
| CN | 107562255 | A | 1/2018 |
| CN | 108021275 | A | 5/2018 |
| CN | 108154901 | A | 6/2018 |
| KR | 20160073928 | A | 6/2016 |
| KR | 10-2017-0072407 | A | 6/2017 |
| KR | 10-2017-0078978 | A | 7/2017 |
| KR | 20170078978 | A | 7/2017 |

* cited by examiner

GATE DRIVER, ORGANIC LIGHT EMITTING DISPLAY DEVICE INCLUDING THE SAME, AND METHOD FOR OPERATING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION(S)

This application claims the benefit of Korea Patent Application No. 10-2018-0131241 filed on Oct. 30, 2018.

BACKGROUND

Technical Field

The present document relates to a gate driver, an organic light emitting display device including the same, and to a method for operating such a gate driver.

Description of the Related Art

An active matrix type organic light emitting display device includes an organic light emitting diode (OLED) which emits light by itself and has a high response speed, a high luminous efficiency, a high brightness and a wide viewing angle.

An organic light emitting display device includes a gate driver for driving switching elements provided in pixels. Gate electrodes of the switching elements are connected to the gate driver through gate lines. The gate driver generates a gate signal (scan signal) and sequentially supplies the gate signal (scan signal) to the gate lines.

BRIEF SUMMARY

An organic light emitting display adopts an external compensation technique to enhance image quality. The external compensation technique senses a pixel voltage or current according to driving characteristics (or electrical characteristics) of pixels and modulates data of an input image on the basis of a sensing result, thus compensating for a driving characteristic variation between pixels. In order for the driving characteristics of the pixels to be sensed during a predetermined time in which an input image is not written, a gate driver operates a specific stage during the predetermined time to output a gate signal for sensing driving. In case of sensing driving, in order for a desired gate signal to be output, a Q node of the specific stage should be sufficiently charged with a gate-on voltage. Since a Q node charging path is longer in case of sensing driving and a time spared for sensing driving is very short as compared with the case of display driving, a charge level for the Q node is insufficient in case of sensing driving. If the desired gate signal is not applied in case of sensing driving, driving characteristics of the pixels may not be accurately sensed, which results in a reduction in compensation performance.

The present disclosure provides a gate driver capable of ensuring desired gate output characteristics by enhancing a charge level for a Q node in case of sensing driving, an organic light emitting display device including the same, and a method for operating the same.

In an embodiment, a gate driver includes a plurality of stages for outputting a gate signal for an image at a time of display driving and outputting a gate signal for sensing at a time of sensing driving that follows the display driving. Each of the stages includes a pixel line selecting unit configured to charge a first node with a first preceding stage carry signal based on a pixel line selection signal for a gate-on voltage during the display driving, and configured to charge a second node with a first high-potential power supply voltage based on a sensing start signal for the gate-on voltage and a charged voltage of the first node during the sensing driving; and an output unit outputting a scan clock for the gate-on voltage as the gate signal for sensing while the second node maintains a charged state on the sensing driving, wherein the first high-potential power supply voltage is higher at the time of the sensing driving than at the time of the display driving.

The first high-potential power supply voltage at the time of the sensing driving may be higher than the first high-potential power supply voltage at the time of the display driving, and lower than a break-down voltage of transistors electrically connected to an input terminal that receives the first high-potential power supply voltage.

Each of the plurality of stages may further include an inverter unit configured to cut off electrical connection between an input terminal that receives a second high-potential power supply voltage and a third node while the second node maintains the charged state on the sensing driving, wherein the first high-potential power supply voltage is higher than the second high-potential power supply voltage at the time of the sensing driving.

The second high-potential power supply voltage may be the same at the times of the display driving and the sensing driving.

A gate-on voltage interval of the first preceding stage carry signal and a gate-on voltage interval of the pixel line selection signal may be identical to each other.

Among the stages, the number of an active stage in which the first node may be charged with the first preceding stage carry signal according to the pixel line selection signal of the gate-on voltage during the display driving is one, and a position of the active stage may be changed at every predetermined time.

The position of the active stage may be randomly changed at every frame according to the gate-on voltage intervals of the first preceding stage carry signal and the pixel line selection signal.

The sensing start signal may be concurrently input as a gate-on voltage to the stages before the gate signal for sensing is output, and a sensing end signal may be concurrently input as a gate-on voltage to the stages after outputting of the gate signal for sensing is terminated.

The display driving may be performed within a vertical active period during which image data is written, and the sensing driving may be performed within a vertical blanking period during which the image data is not written.

The pixel line selecting unit may include: a first transistor; a second transistor, the first transistor and the second transistor electrically connected in series between an input terminal that receives the first preceding stage carry signal and the first node, the first transistor and the second transistor configured to be concurrently turned on based on the pixel line selection signal; a third transistor having a first electrode electrically connected to an input terminal that receives the first high-potential power supply voltage and a second electrode electrically connected between the first transistor and the second transistor, the third transistor configured to be turned on according to the charged voltage of the M node; a fourth transistor having a first electrode electrically connected to the input terminal that receives the first high-potential power supply voltage, the fourth transistor configured to be turned on based on the charged voltage of the first node; and a fifth transistor having a first electrode connected to a second electrode of the fourth transistor, and a second electrode electrically connected to the second node, the fifth transistor configured to be turned on according to the sensing start signal.

The pixel line selecting unit may further include a sixth transistor having a first electrode electrically connected to the Q node and a second electrode connected to an input terminal that receives a low-potential power supply voltage, the sixth transistor configured to be turned on according to the sensing end signal of the gate-on voltage.

The pixel line selecting unit may further include a capacitor connected between the input terminal of the first high-potential power supply voltage and the M node.

The inverter unit may be configured to discharge the third node to a low-potential power supply voltage b a second preceding stage carry signal having a phase of a gate-on voltage ahead of that of the first preceding stage carry signal during the display driving, discharge the third node to the low-potential power supply voltage based on a charged voltage of the second node during the display driving, charge the third node with the second high-potential power supply voltage according to a discharged voltage of the second node during the display driving, discharge the third node to the low-potential power supply voltage based on the sensing start signal and the charged voltage of the first node during the sensing driving, and discharge the third node to the low-potential power supply voltage based on the charged voltage of the second node during the sensing driving.

The inverter unit may include: a first transistor having a first electrode electrically connected to the input terminal that receives the second high-potential power supply voltage and a second electrode electrically connected to an input terminal that receives a low-potential power supply voltage; a second transistor having a first electrode and a gate electrode electrically connected to the input terminal that receives the second high-potential power supply voltage and a second electrode electrically connected to a gate electrode of the first transistor; a third transistor having a first electrode electrically connected to the gate electrode of the first transistor a second electrode electrically connected to the input terminal that receives the low-potential power supply voltage and configured to be turned on based on the charged voltage of the second node; a fourth transistor having a first electrode electrically connected to the third node and a second electrode electrically connected to the input terminal that receives the low-potential power supply voltage and turned on based on the charged voltage of the Q node; a fifth transistor having a first electrode electrically connected to the third node and a second electrode electrically connected to the input terminal that receives the low-potential power supply voltage and turned on based on the second preceding stage carry signal of the gate-on voltage; a sixth transistor having a first electrode electrically connected to the third node and turned on according to the sensing start signal of the gate-on voltage; and a seventh transistor having a first electrode electrically connected to a second electrode of the sixth transistor and a second electrode electrically connected to the input terminal of the low-potential power supply voltage and configured to be turned on based on the charged voltage of the M node.

The inverter unit may include: a first transistor having a first electrode electrically connected to the input terminal that receives the second high-potential power supply voltage, and a second electrode connected to the third node; a second transistor having a first electrode and a gate electrode electrically connected to the input terminal that receives the second high-potential power supply voltage and a second electrode electrically connected to a gate electrode of the first transistor; a third transistor having a first electrode electrically connected to the gate electrode of the first transistor, a second electrode electrically connected to the input terminal that receives the low-potential power supply voltage, and a gate electrode electrically connected to the second node; a fourth transistor having a first electrode electrically connected to the third node, and a second electrode electrically connected to the input terminal that receives the low-potential power supply voltage, and a gate electrode electrically connected to the second node; a fifth transistor having a first electrode electrically connected to the third node, a second electrode electrically connected to the input terminal that receives the low-potential power supply voltage, and a gate electrode to which the second preceding stage carry signal of the gate-on voltage is applied; a sixth transistor having a first electrode electrically connected to the third node and a gate electrode to which the sensing start signal is applied; and a seventh transistor having a first electrode electrically connected to a second electrode of the sixth transistor, and a second electrode electrically connected to the input terminal that receives the low-potential power supply voltage and a gate electrode electrically connected to the first node.

An organic light emitting display device may comprise a gate driver according to an embodiment of the present disclosure, and a plurality of pixels electrically connected to the gate driver through gate lines and driven based on the gate signal for the image and the gate signal for sensing.

In another aspect, a method for operating a gate driver according to an embodiment of the present disclosure comprises: operating the pixel line selecting unit to charge the first node with the first preceding stage carry signal based on the pixel line selection signal for the gate-on voltage during the display driving and to charge the second node with the first high-potential power supply voltage based on the sensing start signal for the gate-on voltage and the charged voltage of the first node during the sensing driving; and operating the output unit to output the scan clock of for the gate-on voltage as the gate signal for sensing while the second node maintains the charged state on the sensing driving, wherein the first high-potential power supply voltage is higher at the time of the sensing driving than at the time of the display driving.

The first high-potential power supply voltage at the time of the sensing driving may be lower than a break-down voltage of transistors electrically connected to an input terminal that receives the first high-potential power supply voltage.

Each of the plurality of stages may further include an inverter unit configured to cut off electrical connection between an input terminal that receives a second high-potential power supply voltage and a third node while the second node maintains the charged state on the sensing driving, and the first high-potential power supply voltage may be higher than the second high-potential power supply voltage at the time of the sensing driving.

The second high-potential power supply voltage may be the same at the times of the display driving and the sensing driving.

A gate-on voltage interval of the first preceding stage carry signal and a gate-on voltage interval of the pixel line selection signal may be identical to each other.

The inverter unit may discharge the third node to a low-potential power supply voltage based on a second preceding stage carry signal having a phase of a gate-on voltage ahead of that of the first preceding stage carry signal during the display driving, discharge the third node to the low-potential power supply voltage (GVSS) based on a charged voltage of the second node during the display driving, charge the third node with the second high-potential power supply voltage based on a discharged voltage of the second node during the display driving, discharge the third node to the low-potential power supply voltage based on the sensing start signal and the charged voltage of the M node during the sensing driving, and discharges the third node to the low-potential power supply voltage based on the charged voltage of the second node during the sensing driving.

DETAILED DESCRIPTION

Figure 1:
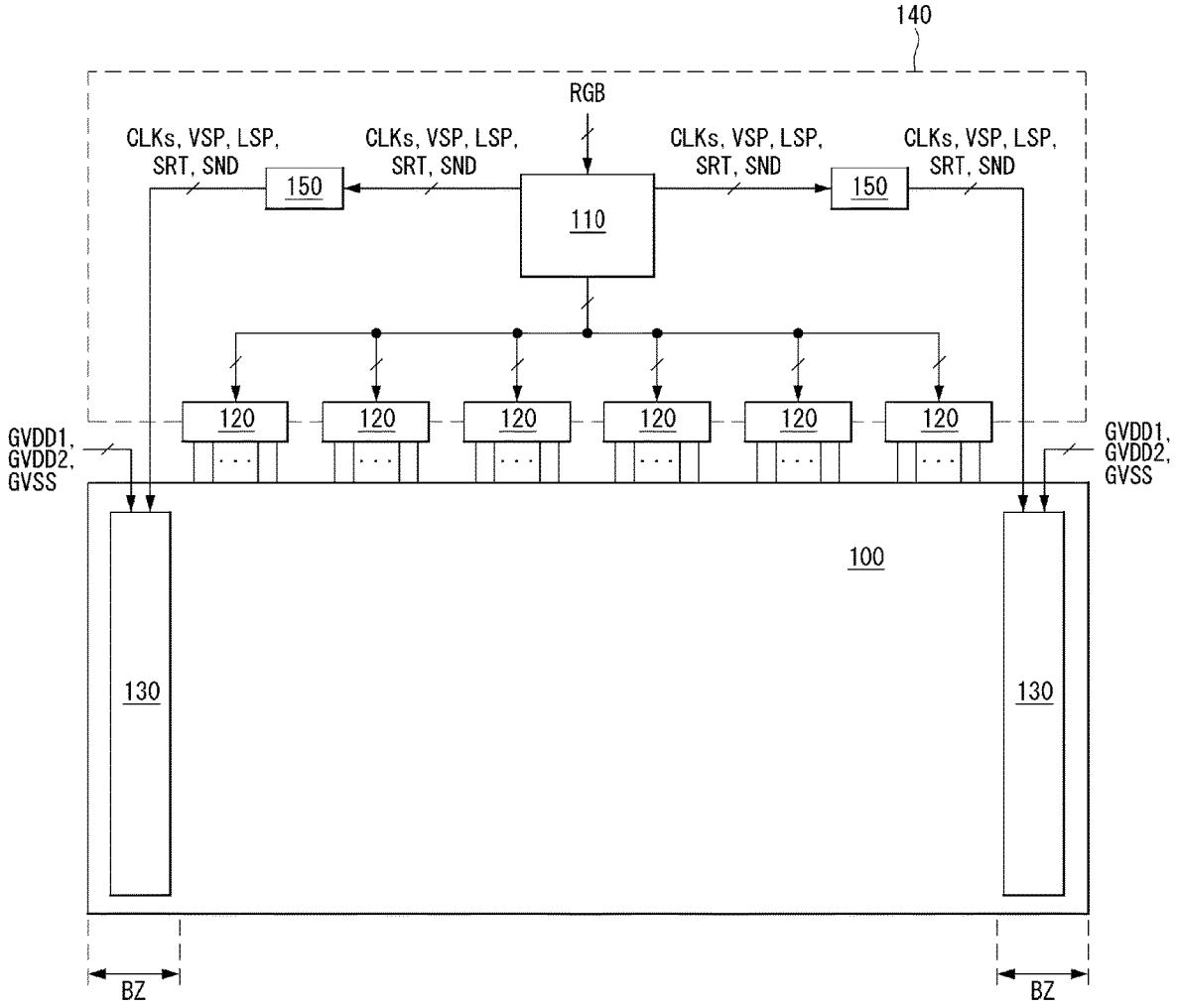
FIG. 1 illustrates an organic light emitting display according to an embodiment of the present disclosure.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

The shapes, sizes, ratios, angles, numbers and the like disclosed in the drawings for describing the embodiments of the present disclosure are illustrative and are not limited to those illustrated in the present disclosure. Like reference numerals refer to like elements throughout the specification. Further, in the description of the present disclosure, detailed description of known related arts will be omitted if it is determined that the gist of the present disclosure may be unnecessarily obscured.

In construing an element, the element is construed as including an error range although there is no explicit description.

In describing a position relationship, for example, when two portions are described as "on", "above", "below", or "on the side", one or more other portions may be positioned between the two portions unless "immediately" or "directly" is used.

It will be understood that, although the terms "first", "second", etc. may be used herein to describe various elements, these elements should not be limited by these terms. These terms are used to distinguish one element from another. For example, a first element could be termed a second element, and, similarly, a second element could be termed a first element, without departing from the scope of the present disclosure.

In this disclosure, a pixel circuit and a gate driver formed on a substrate of a display panel may be realized as a thin film transistor (TFT) having an n-type metal oxide semiconductor field effect transistor (MOSFET) structure, but without being limited thereto, the pixel circuit and a gate driver may also be realized as a TFT having a p-type MOSFET structure. A TFT is a three-electrode element including a gate, a source, and a drain. The source is an electrode that supplies a carrier to a transistor. In the TFT, carriers start to flow from the source. The drain is an electrode through which the carriers exit from the TFT. That is, in the MOSFET, the carriers flow from the source to the drain. In case of the n-type TFT, the carriers are electrons, and thus, a source voltage has a voltage lower than a drain voltage so that electrons may flow from the source to the drain. In the n-type TFT, electrons flow from the source to the drain, and thus, current flows from the drain to the source. In contrast, in case of a p-type TFT (PMOS), since carriers are holes, a source voltage is higher than a drain voltage so that holes may flow from the source to the drain. In the p-type TFT, since holes flow from the source to the drain, current flows from the source to the drain. It should be noted that the source and the drain of the MOSFET are not fixed. For example, the source and the drain of the MOSFET may be changed depending on the applied voltage. Therefore, in the description of the embodiments, one of the source and the drain is referred to as a first electrode and the other is referred to as a second electrode.

Hereinafter, embodiments of the present disclosure will be described in detail with reference to the accompanying drawings. In the following embodiments, an organic light emitting display device including an organic luminescent material will mainly be described as a display device. However, it should be noted that the technical idea of the present disclosure is not limited to the organic light emitting display device but may be applied to any other display devices such as a liquid crystal display.

In describing the present disclosure, if a detailed description for a related known function or construction is considered to unnecessarily divert the gist of the present disclosure, such explanation has been omitted but would be understood by those skilled in the art.

In the following description, "preceding stages" refers to stages which are located above a reference stage and generate gate signals advanced in phase as compared with a gate signal output from the reference stage. Also, "subsequent stages" refer to stages which are positioned below the reference stage and generate gate signals delayed in phase as compared with the gate signal output from the reference stage. In the following description, switching elements constituting a gate driver of the present disclosure may be implemented as at least any one of an oxide element, an amorphous silicon element, and a polysilicon element. Activating a specific stage refers to charging a gate-on voltage to a Q-node of the stage and deactivating a specific stage refers to discharging a Q-node of the stage to a gate-off voltage.

FIG. 1 illustrates an organic light emitting display device according to an embodiment of the present disclosure.

Referring to FIG. 1, the organic light emitting display device of the present disclosure includes a display panel 100, a data driver, a gate driver, and a timing controller 110.

In the display panel 100, a plurality of data lines and a plurality of gate lines overlap each other, and pixels are arranged in a matrix form, thereby forming a pixel array. The pixel array may further include a reference line connected to each pixel.

Each pixel may include an organic light emitting diode (OLED), a driving thin film transistor (TFT), a storage capacitor, and at least one switching TFT. The TFTs may be implemented as a P type, an N type, or a hybrid type in which a P type and an N type are mixed. Further, a semiconductor layer of each TFT may include amorphous silicon, polysilicon, or an oxide.

The timing controller 110 receives image data RGB from an external host system through various known interface schemes. The timing controller 110 may correct the image data RGB to compensate for variations of driving characteristics of the pixels on the basis of a sensing result of real-time sensing and subsequently transmit the corrected image data to source drive ICs 120.

The timing controller 110 receives timing signals such as a vertical synchronization signal Vsync, a horizontal synchronization signal Hsync, and a data enable signal DE from the host system. The timing controller 110 generates a source timing control signal for controlling an operation timing of the data driver on the basis of a timing signal from the host system and a gate timing control signal for controlling an operation timing of the gate driver. The source timing control signal includes a source sampling clock (SSC), a source output enable signal (SOE), and the like. The source sampling clock SSC is a clock signal that controls a sampling timing of data in the source drive ICs 120 on the basis of a rising or falling edge. The source output enable signal SOE is a signal for controlling an output timing of a data voltage.

The timing controller 110 controls a display driving timing and a sensing driving timing for the pixel lines of the display panel 100 on the basis of the source and gate timing control signals so that the driving characteristics of the pixels may be sensed in real time during image displaying.

Here, the pixel line refers to a pixel aggregate of one line in which pixels are adjacent in a horizontal direction. The sensing driving refers to driving of writing sensing data into pixels arranged in a specific pixel line to sense driving characteristics of the corresponding pixels and updating a compensation value for compensating for a change in the driving characteristics of the corresponding pixels on the basis of the sensing result. Hereinafter, an operation for writing the sensing data into the pixels arranged in the specific pixel line at a time of sensing driving will be referred to as sensing data writing (SDW) driving.

The display driving refers to writing input image data RGB into pixel lines within one frame to reproduce an input image on the display panel 100. Hereinafter, the display driving will be referred to as image data writing (IDW) driving.

The timing controller 110 may implement IDW driving during a vertical active period of one frame and may implement SDW driving within a vertical blanking period in which IDW driving is not performed.

The data driver includes a plurality of source drive ICs 120. The source drive ICs 120 receive the image data RGB from the timing controller 110. The source driver ICs 120 convert the image data RGB into a gamma compensation voltage in response to the source timing control signal from the timing controller 110 to generate a data voltage and synchronize the data voltage with a gate signal, and supply the data voltage synchronized with the gate signal to the data lines of the panel 100. The source drive ICs may be connected to the data lines of the display panel 100 through a chip-on-glass (COG) process or a tape automated bonding (TAB) process.

The gate driver includes a gate shift register 130 connected to the gate lines and a level shifter 150 boosting a voltage level of a signal output from the timing controller 110 and supplying the boosted voltage level to the gate shift register 130.

The level shifter 150 boosts a transistor-transistor-logic (TTL) level voltage of a gate timing control signal input from the timing controller 110 to a gate-on voltage and a gate-off voltage capable of switching a TFT formed on the display panel 100. The level shifter 150 supplies the level-shifted gate timing control signal to the gate shift register 130. The gate timing control signal includes a gate start signal VSP, gate shift clocks CLKs, a pixel line selection signal LSP, a sensing start signal SRT, and a sensing end signal SND. The gate shift clocks CLKs are implemented as N-phase (N is a natural number) clocks having different phases.

The gate shift register 130 includes a plurality of stages outputting a gate signal for image in case of IDW driving and outputting a gate signal for sensing in case of SDW driving that follows the IDW driving on the basis of the gate timing control signal input from the level shifter 150 and driving power (high-potential power supply voltage, low-potential power supply voltage) input from a power supply circuit (not shown). Each stage further includes a pixel line selecting unit for SDW driving in addition to an input unit for IDW driving. In order to output a desired gate signal for image and a gate signal for sensing, a Q node of a corresponding stage should be sufficiently charged for IDW driving and SDW driving. However, since a Q node charge path of the pixel line selecting unit is longer than a Q node charge path of the input unit and a time spared for SDW driving is very short, the Q node charge voltage for outputting the gate signal for sensing may be less a target value.

In order to sufficiently secure the Q-node charge voltage for SDW driving, the power supply circuit dualizes a high-potential power supply voltage applied to each stage to a first high-potential power supply voltage GVDD1 applied to the pixel line selecting unit and a second high-potential power supply voltage GVDD2 applied to an inverter unit, and periodically changes a voltage level of the first high-potential power supply voltage GVDD1. That is, the power supply circuit sets the first high-potential power supply voltage GVDD1 to be higher at the time of SDW driving than at the time of the IDW driving. However, the power supply circuit may set the second high-potential power supply voltage GVDD2 to be equal to the first high-potential power supply voltage GVDD1 at the time of IDW driving to ensure operational stability of the stages. The second high-potential power supply voltage GVDD2 is kept constant without being changed periodically.

The gate shift register 130 may be formed directly on a substrate of the display panel 100 in a gate-in-panel (GIP) manner. The gate shift register 130 may be formed in an area (i.e., a bezel (BZ) area) where an image is not displayed on the display panel 100, but is not limited thereto. In order to minimize distortion of a gate signal due to RC delay, the gate shift register 130 may be formed at a first side bezel area BZ and a second side bezel area BZ of the display panel 100 in a double bank manner, but is not limited thereto.

Figure 2:
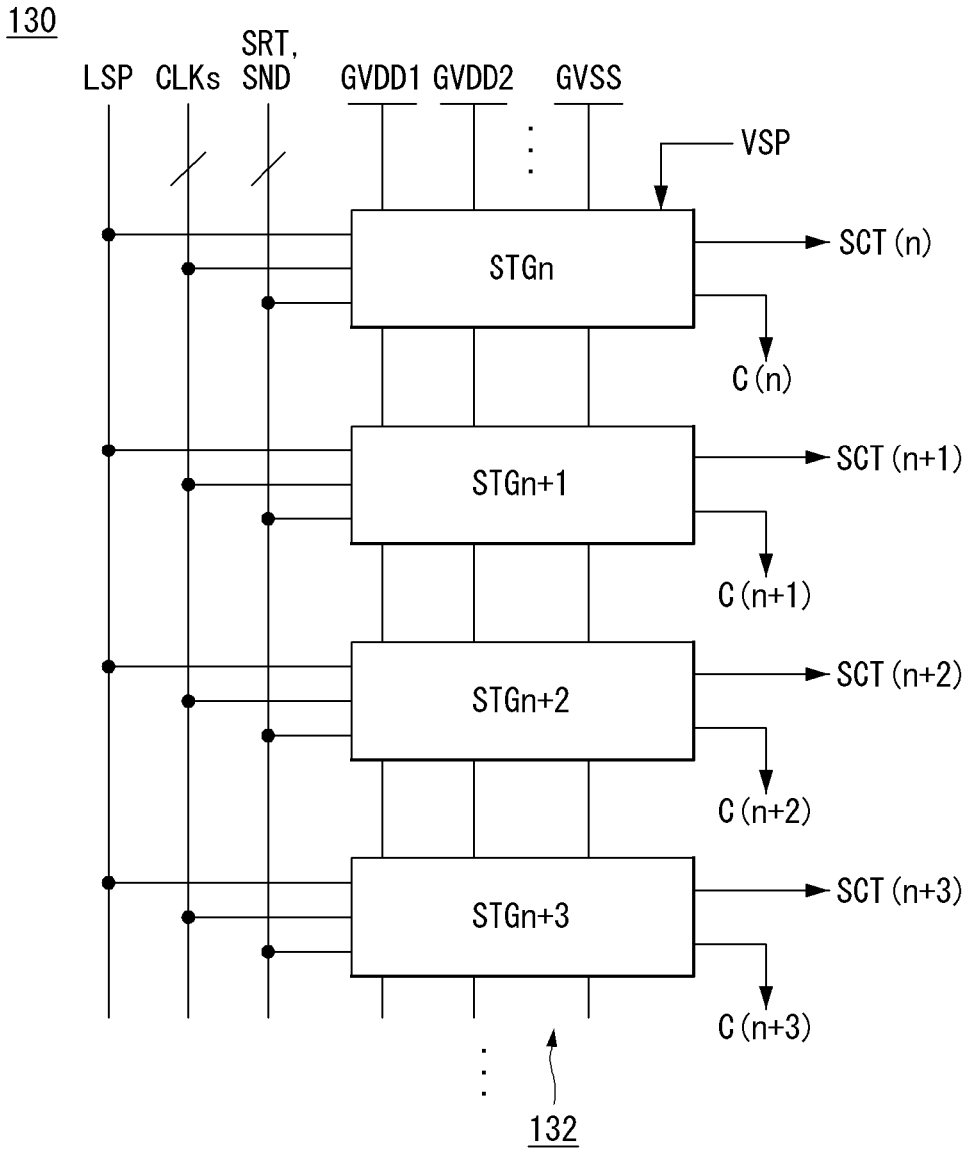
FIG. 2 shows a connection structure between stages constituting a gate shift register of FIG. 1.

FIG. 2 illustrates a connection configuration between signal lines and the stages 132 included in the gate shift register 130 of FIG. 1.

Referring to FIG. 2, the gate shift register 130 according to an embodiment of the present disclosure includes a plurality of stages 132 cascaded to each other. The stages 132 may be GIP elements formed in a GIP (gate driver in panel) manner. At least one upper dummy stage may further be provided at a preceding stage of the uppermost stage, and at least one lower dummy stage may further be provided at a subsequent stage of the lowermost stage. However, the present disclosure is not limited thereto.

The stages 132 are connected the gate lines of the display panel 100, respectively.

The stages 132 generate a gate signal on the basis of the high-potential power supply voltages GVDD1 and GVDD2, a low-potential power supply voltage GVSS, the gate start signal VSP, carry signals C(n) to C(n+3), the gate shift clocks CLKs, the pixel line selection signal LSP, the sensing start signal SRT, the sensing end signal SND, and the like. The gate signal may include scan signals SCT(n) to SCT (n+3), and the carry signals C(n) to C(n+3) and may further include a sense signal (not shown).

Figure 3:
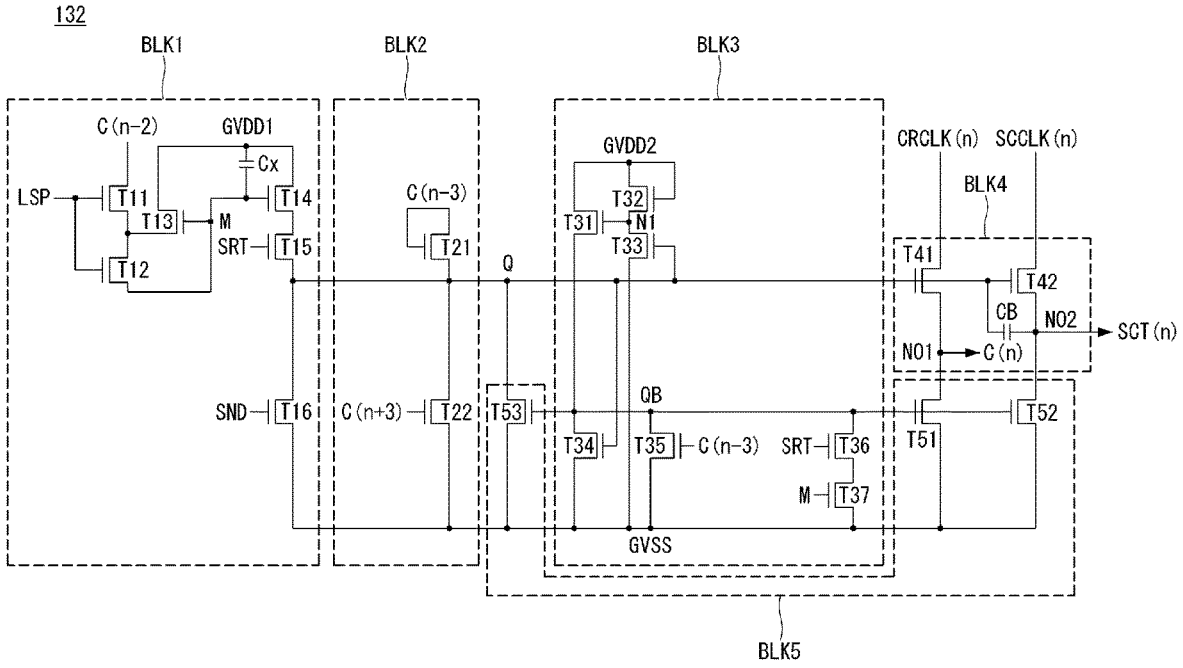
FIG. 3 is a circuit diagram illustrating a stage according to an embodiment of the present disclosure.

A stage configuration in which a scan signal SCT(n) and a carry signal C(n) are generated as gate signals is illustrated in FIG. 3. The stage 132 of FIG. 3 generates the scan signal SCT(n) and supplies the generated scan signal SCT(n) to the gate lines GLn of the display panel 100 and generates the carry signal C(n) and supplies the generated carry signal C(n) to previous and rear stages.

The stages 132 independently generate the carry signals C(n) to C(n+3), thereby preventing the carry signals from being distorted by a gate load. The stages 132 generate the carry signals C(n) to C(n+3) and supply them as a start signal to one of the subsequent stages and supply them as a reset signal to any one of the preceding stages.

Each of the stages 132 activates an operation of the Q node according to the gate start signal VSP or the preceding stage carry signal applied to a start terminal each frame. The preceding stage signal is a carry signal applied from any one of the preceding stages. Each of the stages 132 deactivates the operation of the Q node according to a subsequent stage carry signal applied to a reset terminal every frame. The subsequent stage carry signal is a carry signal applied from one of the subsequent stages.

The gate start clock VSP, the gate shift clocks CLKs, the pixel line selection signal LSP, the sensing start signal SRT, and the sensing end signal SND are supplied to the stages 132 in common. The gate shift clocks CLKs implemented as N-phase (N is a natural number) clocks having different phases may include N-phase carry clocks and N-phase scan clocks.

The scan clocks are clock signals for generating scan signals SCT(n) to SCT(n+3) for image or sensing and the carry clocks are clock signals for generating previous or subsequent stage carry signals C(n) n+3). The scan clocks swing between a gate-on voltage and a gate-off voltage so as to be synchronized with the scan signals SCT(n) to SCT(n+3). The carry clocks are swung between the gate-on voltage and the gate-off voltage so as to be synchronized with the carry signals C(n) to C(n+3).

In case of IDW driving, all the stages 132 are activated in one frame to sequentially output scan signals SCT(n) to SCT(n+3) for image and sequentially output carry signals C(n) to C(n+3) for image. Meanwhile, in case of SDW driving, one specific stage 132 is activated in one frame to output a scan signal for sensing.

The pixel line selection signal LSP is input to the specific stage 132, as a gate-on voltage at the time of IDW driving. A gate-on voltage interval is set such that the pixel line selection signal LSP is synchronized with a first preceding stage carry signal input to the specific stage 132 at the time of IDW driving. Accordingly, the first preceding stage carry signal of the gate-on voltage is charged to the M node of the specific stage 132 according to the pixel line selection signal LSP of the gate-on voltage.

Meanwhile, the pixel line selection signal LSP is input, as a gate-on voltage, to the other remaining stages 132 excluding the specific stage 132 at the time of IDW driving. However, since the preceding stage carry signals input to the other remaining stages 132 do not overlap the pixel line selection signal LSP in the gate-on voltage interval, the M nodes of the other remaining stages 132 are not charged with the gate-one voltage at the time of IDW driving.

As described above, the number of active stages (which refers to the specific stage) in which the M node is charged with the gate-on voltage by the first preceding stage carry signal which overlaps the pixel line selection signal LSP in the gate-on voltage interval is 1 per predetermined time (e.g., one frame). A position of this active stage changes at every predetermined time. For example, the position of the active stage may change randomly at every frame according to setting of the gate-on voltage interval of the first preceding stage carry signal and the pixel line selection signal LSP.

The sensing start signal SRT is input, as a gate-on voltage, to the specific stage 132 at a time of SDW driving. Therefore, the Q node of the specific stage 132 is charged with the first high-potential power supply voltage GVDD1 according to the sensing start signal SRT of the charge voltage of the M node of the specific stage 132 and the gate-on voltage. Here, since the first high-potential power supply voltage GVDD1 is set to be higher in case of IDW driving than in case of SDW driving, the Q node may be rapidly charged to the gate-on voltage at the time of SDW driving.

Meanwhile, the sensing start signal SRT is input as the gate-on voltage to the other remaining stages 132 excluding the specific stage 132 at the time of SDW driving. However, since the M nodes of the other remaining stages 132 are not charged, the Q nodes of the other remaining stages 132 may not be charged with the gate-on voltage at the time of SDW driving.

The sensing end signal SND is input to the specific stage 132 as a gate-on voltage at the time of SDW driving to discharge the Q node of the specific stage 132 to a gate-off voltage. The sensing end signal SND is input to the specific stage 132 after the scan signal for sensing is output from the specific stage 132.

Meanwhile, the sensing end signal SND may be input as a gate-on voltage to the other remaining stages 132 excluding the specific stage 132 at the time of SDW driving.

Figure 4:
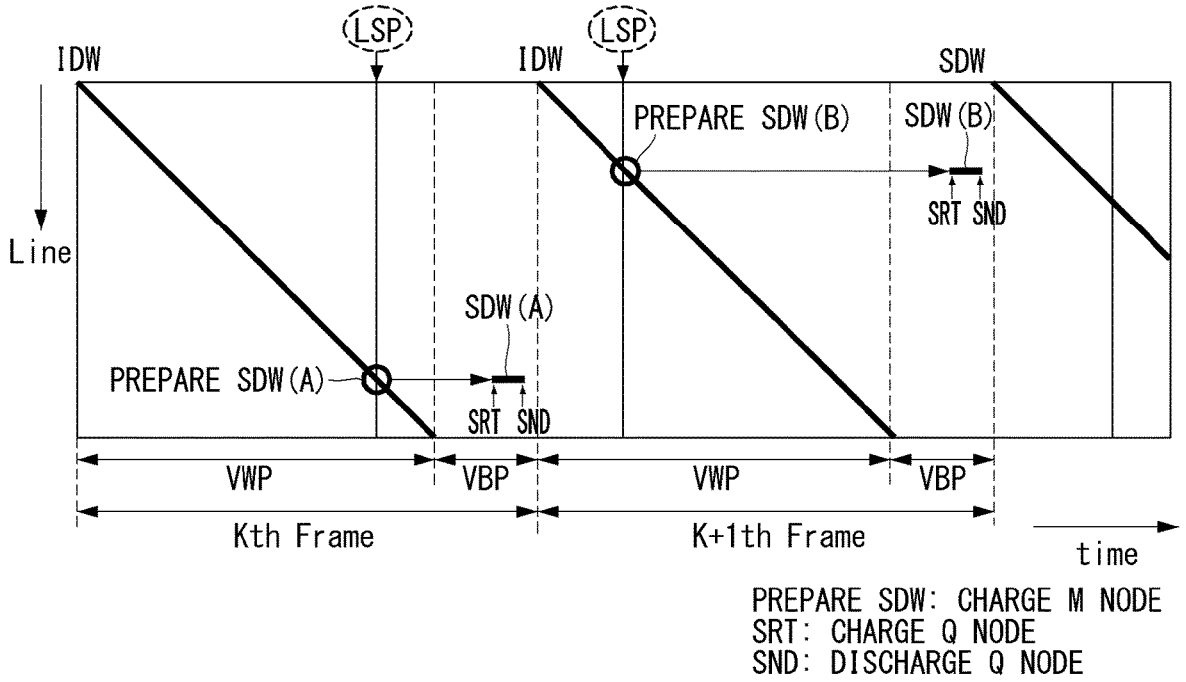
FIG. 4 is a diagram illustrating a timing at which display driving and sensing driving are performed on the basis of a gate signal output from the stages of FIGS. 2 and 3.

FIG. 3 is a circuit diagram illustrating a stage according to an embodiment of the present disclosure. FIG. 4 is a diagram illustrating timings at which IDW driving and SDW driving are performed on the basis of gate signals output from the stages of FIGS. 2 and 3.

Figure 8:
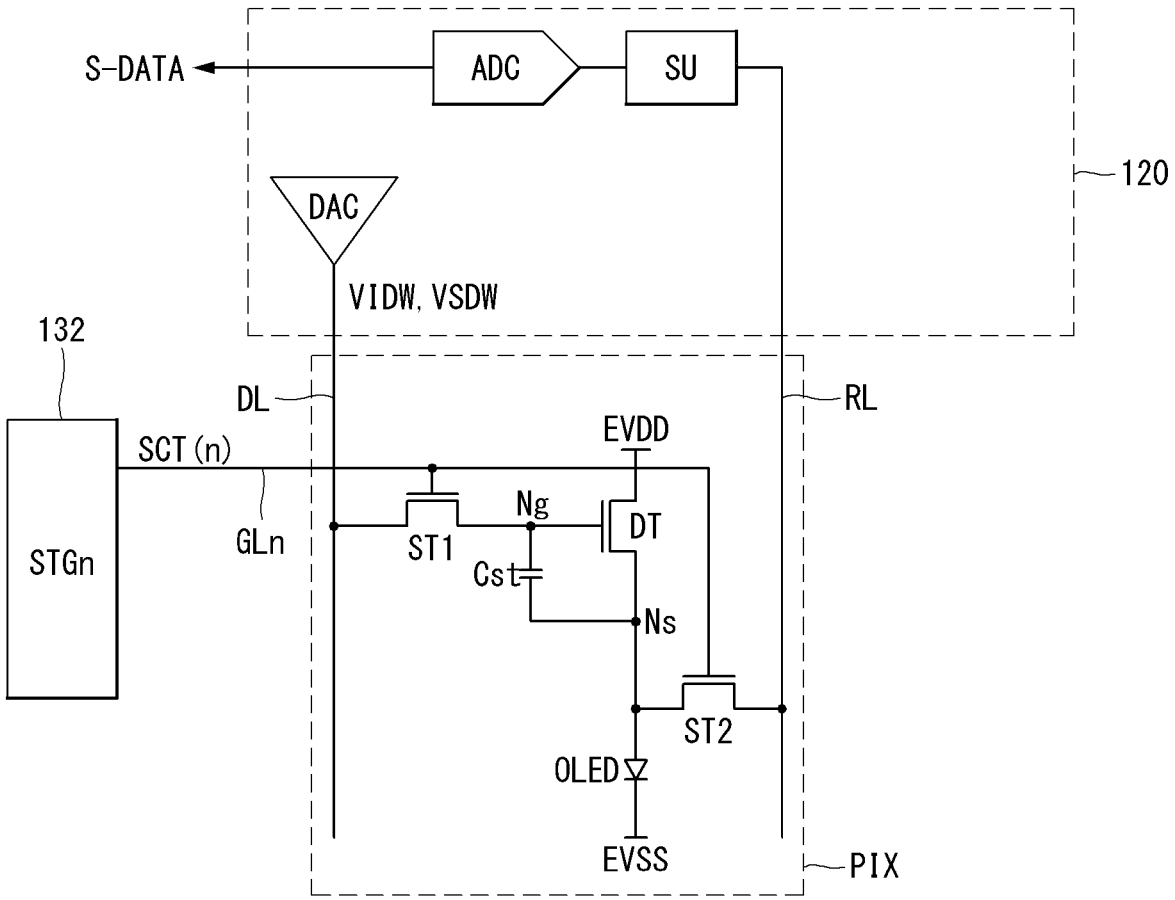
FIG. 8 is a view illustrating a pixel connected to a stage of FIG. 3 and a data driver connected to the pixel.

The stage 132 in FIG. 3 is an nth stage STGn for outputting the nth scan signal SCT(n) for image and sensing and the nth carry signal C(n) for image. In FIG. 3, the second high-potential power supply voltage GVDD2 may be substantially equal to the gate-on voltage, and the low-potential power supply voltage GVSS may be substantially equal to the gate-off voltage. The stage 132 of FIG. 3 may be connected to the pixel PIX as shown in FIG. 8 through the gate line GLn.

Referring to FIGS. 3 and 4, the stage 132 includes a pixel line selecting unit BLK1, an input unit BLK2, an inverter unit BLK3, an output unit BLK4, and a stabilization unit BLK5.

While IDW driving is performed during a vertical active period VWP of one frame, the pixel line selecting unit BLK1 charges the M node with the first preceding carry signal C(n−2) according to the pixel line selection signal LSP of a gate-on voltage to prepare SDW driving. Subsequently, the pixel line selecting unit BLK1 charges the Q node with the first high-potential power supply voltage GVDD1 according to the sensing start signal SRT of a gate-on voltage and the charged voltage of the M node during the vertical blanking period VBP of one frame to case SDW driving to be started.

The pixel line selecting unit BLK1 may include first to fifth transistors T11 to T15. The first and second transistors T11 and T12 are turned on according to the pixel line selection signal LSP of the gate-on voltage during the vertical active period VWP, the third and fourth transistors T13 and T14 are turned on while the M node maintains the charged state, and the fifth transistor T15 is turned on according to the sensing start signal SRT of the gate-on voltage within the vertical blanking period VBP.

The first transistor T11 and the second transistor T12 are connected in series between an input terminal of the first preceding stage carry signal C(n−2) and the M node and concurrently turned on according to the pixel line selection signal LSP to apply the first preceding stage carry signal C(n−2) to the M node. When the gate-on voltage interval of the first preceding stage carry signal C(n−2) is synchronized with the pixel line selection signal LSP of the gate-on voltage, the M node is charged with the gate-on voltage by the first preceding stage carry signal C(n−2).

A first electrode of the third transistor T13 is connected to an input terminal of the first high-potential power supply voltage GVDD1 and a second electrode of the third transistor T13 is connected between the first transistor T11 and the second transistor T12, and a gate electrode of the third transistor T13 is connected to the M node. The third transistor T13 is turned according to the charged voltage of the M node to apply the first high-potential power supply voltage GVDD1 between the first transistor T11 and the second transistor T12 to reduce an off current of the first and second transistors T11 and T12 and stably maintain the charged voltage of the M node until the vertical blanking period VBP in which the SDW driving is performed.

A first electrode of the fourth transistor T14 is connected to the input terminal of the first high-potential power supply voltage GVDD1, a second electrode of the fourth transistor T14 is connected to one electrode of the fifth transistor T15, and a gate electrode of the fourth transistor T14 is connected to the M node. The fourth transistor T14 is turned on according to the charged voltage of the M node to apply the first high-potential power supply voltage GVDD1 to the first electrode of the fifth transistor T15.

A first electrode of the fifth transistor T15 is connected to the second electrode of the fourth transistor T14, a second electrode of the fifth transistor T15 is connected to the Q node, and a gate electrode of the fifth transistor T15 is connected to an input terminal of the sensing start signal SRT. The fifth transistor T15 is turned on according to the sensing start signal SRT of the gate-on voltage to apply the first high-potential power supply voltage GVDD1 to the Q node.

In addition, the pixel line selecting unit BLK1 may further include a sixth transistor T16 and a capacitor Cx.

The capacitor Cx is connected between the input terminal of the first high-potential power supply voltage GVDD1 and the M node to stably maintain the charged voltage of the M node until the vertical blanking period VBP in which SDW driving is performed.

The sixth transistor T16 is turned on in response to the sensing end signal SND of the gate-on voltage within the vertical blanking period VBP to discharge the node Q to the low-potential power supply voltage GVSS. The sensing end signal SND is input as the gate-on voltage within the vertical blanking period VBP after the nth scan signal SCT(n) for sensing is output. A gate electrode of the sixth transistor T16 is connected to an input terminal of the sensing end signal SND, a first electrode of the sixth transistor T16 is connected to the Q node, and a second electrode of the sixth transistor T16 is connected to the input terminal of the low-potential power supply voltage GVSS.

The input unit BLK2 charges and discharges the Q node for IDW driving. The input unit BLK2 does not operate at the time of SDW driving.

At the time of IDW driving, the input unit BLK2 charges the Q node with the second preceding stage carry signal C(n−3) of the gate-on voltage in response to the second preceding stage carry signal C(n−3) input through the start terminal. The gate-on voltage of the second preceding stage carry signal C(n−3) is ahead of that of the first preceding stage carry signal C(n−1). The input unit BLK2 discharges the Q node to the low-potential power supply voltage GVSS in response to the subsequent stage carry signal C(n+3) input through the reset terminal.

To this end, the input unit BLK2 includes a plurality of transistors T21 and T22. A first transistor T21 includes a gate electrode and a first electrode connected to an input terminal (start terminal) of the second preceding stage carry signal C(n−3) and a second electrode connected to the Q node, and applies the second preceding stage carry signal C(n−3) of the on-voltage to the Q node. The second transistor T22 includes a gate electrode connected to an input terminal (reset terminal) of the subsequent stage carry signal C(n+3), a first electrode connected to the Q node, and a second electrode connected to the input terminal of the low-potential power supply voltage. While the subsequent stage carry signal C(n+3) is being input, the second transistor T22 connects the Q node and the low-potential power supply voltage GVSS to discharging the Q node.

At the time of IDW driving and SDW driving, the inverter unit BLK3 charges and discharges a QB node and the Q node in a mutually opposite manner. At the time of IDW driving, the inverter unit BLK3 first discharges the QB node to the low-potential power supply voltage GVSS according to the second preceding stage carry signal C(n−3) having a phase of the gate-on voltage ahead of that of the first preceding stage carry signal C(n−2), secondly discharges the QB node to the low-potential power supply voltage GVSS according to the charged voltage of the Q node, and subsequently charges the QB node with the second high-potential power supply voltage GVDD2 according to the discharged voltage of the Q node. Subsequently, at the time of SDW driving, the inverter unit BLK3 thirdly discharges the QB node to the low-potential power supply voltage GVSS according to the sensing start signal SRT of the gate-on voltage and the charged voltage of the M node and subsequently fourthly discharges the QB node to the low-potential power supply voltage GVSS according to the charged voltage of the Q node.

At the time of IDW driving and SDW driving, the inverter unit BLK3 interrupts electrical connection between the input terminal of the second high-potential power supply voltage GVDD2 and the QB node while the Q node maintains the charged state. The inverter unit BLK3 may charge the QB node by applying the second high-potential power supply voltage GVDD2 to the QB node according to a voltage of an N1 node. The voltage of the N1 node is controlled to be opposite to the Q node. The N1 node is discharged to low-potential power supply voltage GVSS while the Q node maintains the charged state, and when Q node maintains a discharged state, the N1 node is charged with the second high-potential power supply voltage GVDD2. In other words, the potential of the QB node is charged with the second high-potential power supply voltage GVDD2 while the low-potential power supply voltage GVSS is applied to the Q node.

To this end, the inverter unit BLK3 includes a plurality of transistors T31 to T33. A first transistor T31 includes a gate electrode connected to the N1 node, a first electrode connected to the input terminal of the second high-potential power supply voltage GVDD2, and a second electrode connected to the QB node. The second transistor T32 includes a gate electrode and a first electrode connected to the input terminal of the second high-potential power supply voltage GVDD2, and a second electrode connected to the N1 node. The third transistor T33 includes a gate electrode connected to the Q node, a first electrode connected to the N1 node, and a second electrode connected to the input terminal of the low-potential power supply voltage GVSS.

At the time of IDW driving and SDW driving, the inverter unit BLK3 discharges the QB node to the low-potential power supply voltage GVSS while the Q node is being charged. Also, the inverter unit BLK3 may further discharge the QB node to the low-potential power supply voltage GVSS according to the second preceding stage carry signal C(n−3) in order to increase reliability of the operation.

To this end, the inverter unit BLK3 further includes a plurality of transistors T34 and T35. A fourth transistor T34 includes a gate electrode connected to the Q node, a first electrode connected to the QB node, and a second electrode to which the low-potential power supply voltage GVSS is applied. A fifth transistor T35 includes a gate electrode to which the second preceding stage carry signal C(n−3) is applied, a first electrode connected to the QB node, and a second electrode to which the low-potential power supply voltage GVSS is applied.

In order to further increase reliability of the operation, at the time of SDW driving, the inverter unit BLK3 discharges the QB node to the low-potential power supply voltage GVSS according to the sensing start signal SRT of the gate-on voltage and the charged voltage of the M node.

To this end, the inverter unit BLK3 further includes a plurality of transistors T36 and T37. A sixth transistor T36 includes a gate electrode to which the sensing start signal SRT is applied, a first electrode connected to the QB node, and a second electrode connected to one electrode of a seventh transistor T37. The seventh transistor T37 includes a gate electrode connected to the M node, a first electrode connected to the second electrode of the sixth transistor T36, and a second electrode to which the low-potential power supply voltage GVSS is applied.

At the time of IDW driving, the output unit BLK4 outputs a scan clock SCCLK(n) of the gate-on voltage as a scan signal SCT(n) for image and outputs a carry clock CRCLK (n) of the gate-on voltage as a carry signal C(n) for image, while the Q node maintains the charged state. Also, at the time of SDW driving, the output unit BLK4 outputs the scan clock SCCLK(n) of the gate-on voltage as the scan signal SCT(n) for sensing, while the Q node maintains the charged state.

To this end, the output unit BLK4 includes first and second pull-up transistors T41 and T42 and a boosting capacitor CB. The first pull-up transistor T41 includes a gate electrode connected to the Q node, a first electrode connected to the input terminal of the carry clock signal CRCLK(n), and a second electrode connected to the first output node NO1. The second pull-up transistor T42 includes a gate electrode connected to the Q node, a first electrode connected to the input terminal of the scan clock SCCLK(n), and a second electrode connected to the second output node NO2. Since the gate electrodes of the first and second pull-up transistors T41 and T42 are connected to the same Q node, a configuration and a mounting area of the stage 132 are reduced and the bezel area is advantageously reduced. The boosting capacitor CB is connected between the Q node and the second output node NO2 so that a voltage of the Q node is bootstrapped in synchronization with the scan clock SCCLK(n) of the gate-on voltage. When the voltage of the Q node is bootstrapped, the scan clock SCCLK(n) of the gate-on voltage may be output to the scan signal SCT(n) for image quickly and without distortion.

The stabilization unit BLK5 stabilizes a voltage state of the Q node and the output nodes NO1 and NO2 by applying the low-potential power supply voltage GVSS to the Q node and the output nodes NO1 and NO2 while the QB node is being charged.

To this end, the stabilization unit BLK5 includes a plurality of transistors T51 to T53. A first transistor T51 includes a gate electrode connected to the QB node, a first electrode connected to the first output node NO1, and a second electrode to which the low-potential power supply voltage GVSS is applied. A second transistor T52 includes a gate electrode connected to the QB node, a first electrode connected to the second output node NO2, and a source electrode to which the low-potential power supply voltage GVSS is applied. A third transistor T53 includes a gate electrode connected to the QB node, a first electrode connected to the Q node, and a second electrode to which the low-potential power supply voltage GVSS is applied.

Referring to FIG. 4, the number of active stages in which the M node is charged with the gate-on voltage at the time of IDW driving may be one per frame. The position of this active stage may be changed randomly at each frame. When the position of the active stage is changed randomly every frame for SDW driving, the pixel line which is SDW- DRIVEN is randomly changed. For example, after the M node of a first active stage connected to a pixel line A is charged (prepared for SDW) during the vertical active period VWP of a Kth frame, the pixel line A may be sensed according to a gate signal for sensing output from the first active stage within the vertical blanking period VBP of the Kth frame. Also, after the M node of a second active stage connected to a pixel line B is charged (prepared for SDW) during the vertical active period VWP of a (K+1)th frame, the pixel line b may be sensed according to a gate signal for sensing output from the second active stage within the vertical blanking period VBP of the (K+1)th frame.

Since the pixels stop emitting light at the time of SDW driving, when the pixel lines are sequentially sensed, the sensed pixel lines may be visually recognized as a line dim. Here, if the pixel lines are sensed in a random order, rather than being sequentially sensed, the line dim may not be visible due to a visual dispersion effect.

Figure 5:
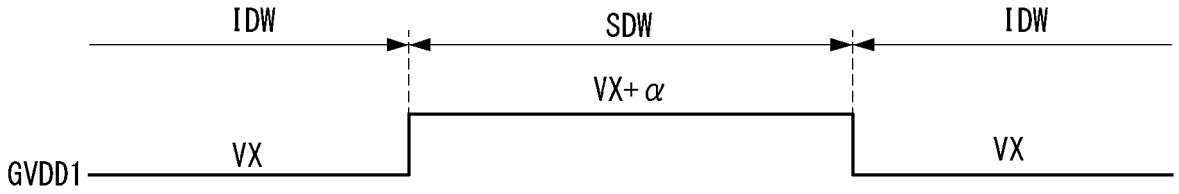
FIG. 5 is a view illustrating that a first high-potential power supply voltage applied to each stage is higher during sensing driving than during display driving.
Figure 6:
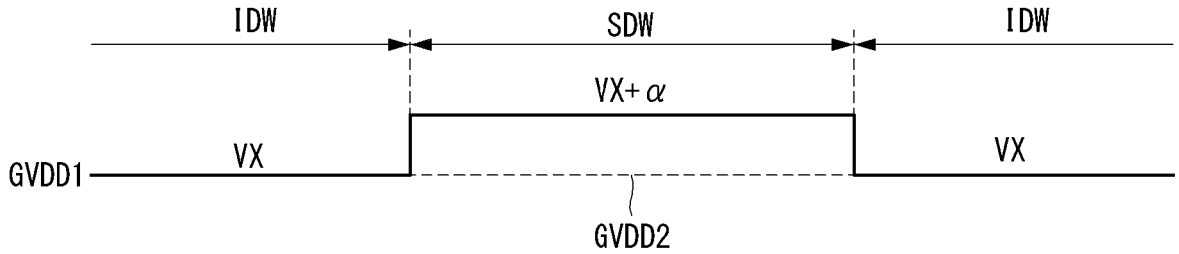
FIG. 6 is a graph illustrating that first and second high-potential power supply voltages applied to each stage are equal during display driving and that the first high-potential power supply voltage is higher than the second high-potential power supply voltage during sensing driving.
Figure 7:
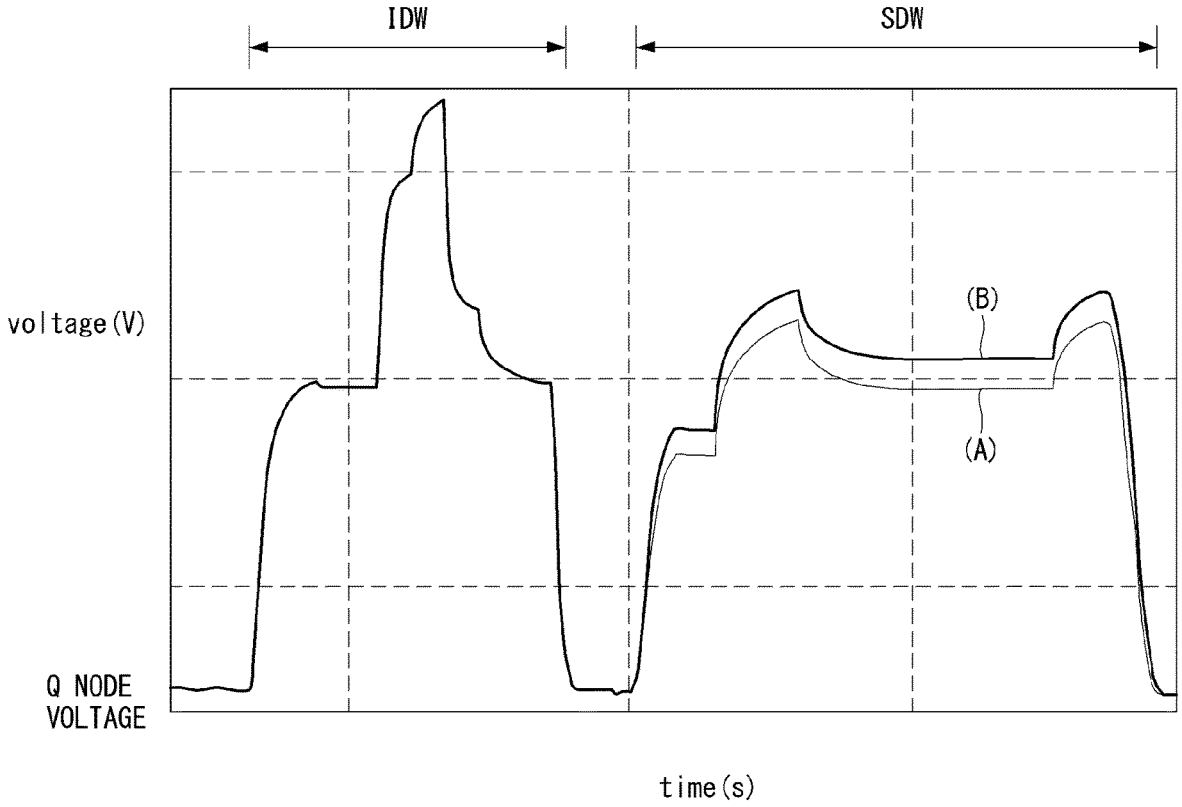
FIG. 7 is a view illustrating a change in Q-node voltage according to a first high-potential power supply voltage in FIGS. 5 and 6 during display driving and sensing driving.

FIG. 5 is a view illustrating that the first high-potential power supply voltage applied to the stage of FIG. 3 is higher at the time of SDW driving than at the time of IDW driving. FIG. 6 is a view illustrating that the first and second high-potential power supply voltages applied to the stage of FIG. 3 are the same at the time of IDW driving and the first high-potential power supply voltage is higher than the second high-potential power supply voltage at the time of SDW driving. FIG. 7 is a view illustrating a change in Q-node voltage according to the first high-potential power supply voltage in FIGS. 5 and 6 at the times of display driving and sensing driving.

Referring to FIGS. 5 and 6, the high-potential power supply voltage applied to the stage 132 of FIG. 3 is dualized to the first high-potential power supply voltage GVDD1 applied to the pixel line selecting unit BLK1 and the second high-potential power supply voltage GVDD2 applied to the inverter unit BLK3.

In order to sufficiently secure a Q node charge voltage at the time of SDW driving, the first high-potential power supply voltage GVDD1 is set to be higher at the time of SDW driving than at the time of IDW driving. The first high-potential power supply voltage GVDD1 at the time of SDW driving may be set to "VX+α" higher than "VX" which is the first high-potential power supply voltage GVDD1 for IDW driving and lower than a break-down voltage of the transistors T13 and T14 connected to the input terminal of the first high-potential power supply voltage GVDD1. As illustrated in FIG. 7, in case of SDW driving, a Q node charge rate and a charge time may be improved as the first high-potential power supply voltage GVDD1 is higher. In FIG. 7, (A) is a Q node voltage when the first high-potential power supply voltage GVDD1 for SDW driving is set to "VX", and (B) is a Q node voltage when the first high-potential power supply voltage GVDD1 for SDW driving is set to "VX+α".

However, in case of SDW driving, a load applied to the transistors T13 and T14 increases as the first high-potential power supply voltage GVDD1 is higher. Thus, the first high-potential power supply voltage GVDD1 for SDW driving is increased within a voltage range lower than the break-down voltage of the transistors T13 and T14.

However, in order to ensure operational stability of the stage, the second high-potential power supply voltage GVDD2 may be set to be equal for IDW and SDW driving. For example, as shown in FIG. 6, the second high-potential power supply voltage GVDD2 may be set to "VX" which is equal to the first high-potential power supply voltage GVDD1 for the IDW driving.

Figure 9:
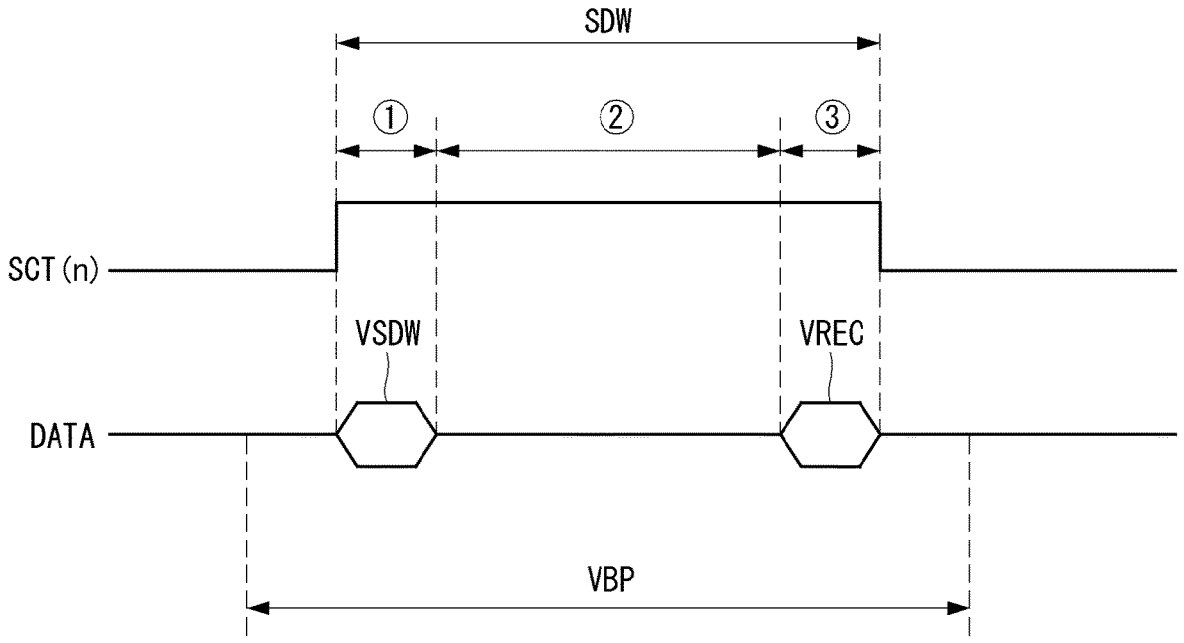
FIG. 9 is a view illustrating a gate signal and a data signal for sensing driving.
Figure 10A:
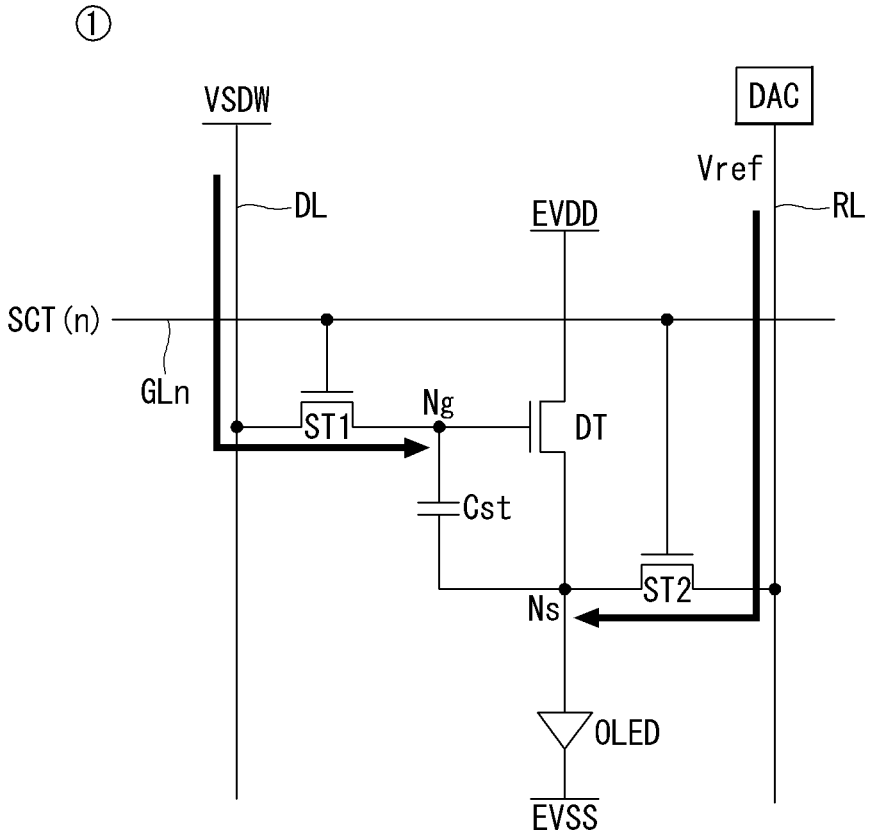
FIG. 10A is an equivalent circuit diagram of a pixel corresponding to a setup period of FIG. 9.
Figure 10B:
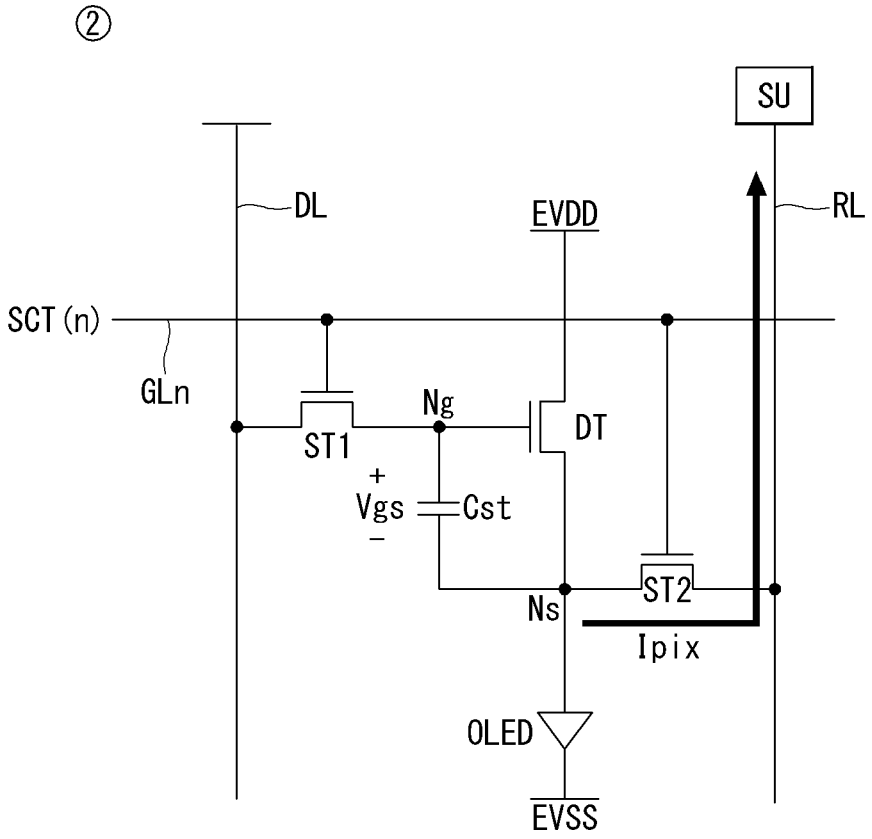
FIG. 10B is an equivalent circuit diagram of a pixel corresponding to a sensing period of FIG. 9.
Figure 10C:
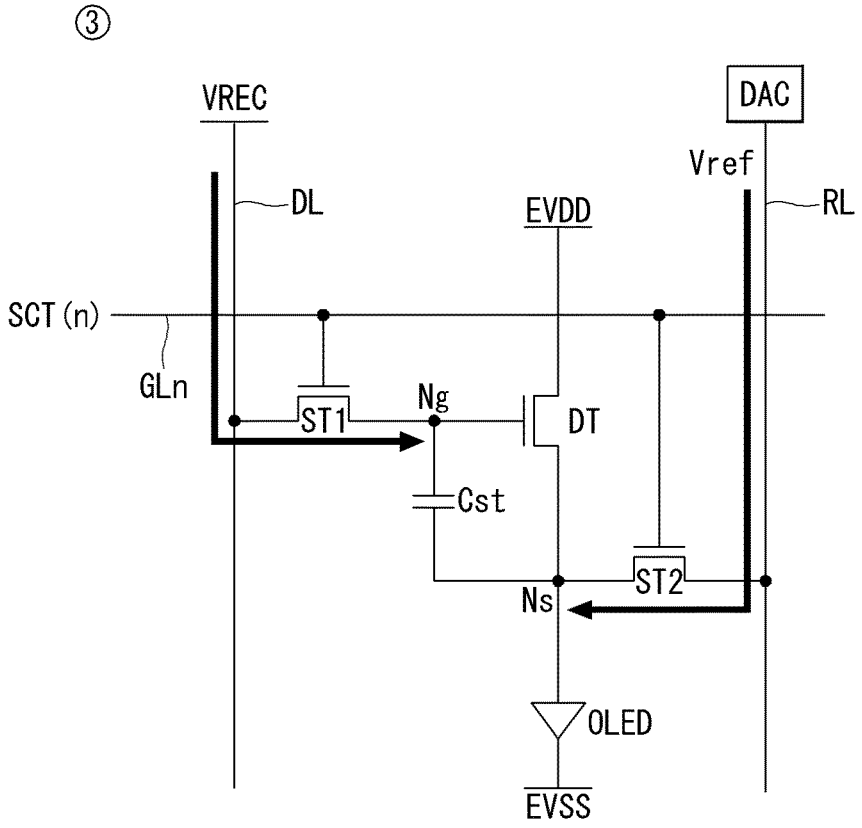
FIG. 10C is an equivalent circuit diagram of a pixel corresponding to a reset period of FIG. 9.

FIG. 8 is a view illustrating a pixel connected to a stage of FIG. 3 and a data driver connected to the pixel. FIG. 9 is a view illustrating a gate signal and a data signal for sensing driving. FIG. 10A is an equivalent circuit diagram of a pixel corresponding to a setup period of FIG. 9. FIG. 10B is an equivalent circuit diagram of a pixel corresponding to a sensing period of FIG. 9. FIG. 10C is an equivalent circuit diagram of a pixel corresponding to a reset period of FIG. 9.

The scan signal SCT(n) for image or sensing output from the stage 132 in FIG. 3 is supplied to the pixel PIX through the gate line GLn in FIG. 8. The pixel PIX in FIG. 8 may perform a sensing operation for external compensation. The sensing for external compensation is a technique for sensing driving characteristics of the pixel PIX and correcting the image data RGB on the basis of the sensing result.

The pixel PIX in FIG. 8 is IDW-driven during the vertical active period and SDW-driven during the vertical blanking period. The source drive IC 120 includes a digital-to-analog converter (DAC). The DAC may convert the image data RGB to a data voltage VIDW for image at the time of IDW driving, generate a data voltage for sensing to be written into the pixel PIX at the time of SDW driving, and further generate a reference voltage Vref to be written into the pixel PIX. The source drive IC 120 further includes a sensing circuit SU and an analog-to-digital converter (ADC) for SDW driving. The sensing circuit SU may be implemented as a current sensing type or a voltage sensing type. The ADC converts an analog signal sampled in the sensing circuit SU into digital data S-DATA. A reference line RL connected to each pixel PIX may be selectively connected to the DAC and the sensing circuit SU through a switch circuit (not shown).

Referring to FIG. 8, the pixel PIX may include an OLED, a driver TFT DT, a first switching TFT ST1, a second switching TFT ST2, and a storage capacitor Cst.

First, the operation of the pixel PIX for IDW driving will be described. The IDW driving may be implemented with a programming period and an emission period.

During the programming period, the first switching TFT ST1 is turned on according to the scan signal SCT(n) for image from the gate line GLn to supply the data voltage VIDW for image on the data line DL to the gate electrode Ng of the driving TFT DT. During the programming period, the second switching TFT ST2 is turned on according to the scan signal SCT(n) for image from the gate line GLn to supply the reference voltage Vref on the reference line RL to the source electrode Ns of the driving TFT DT. Therefore, during the programming period, a gate-source voltage of the driving TFT DT is set to "Vdata−Vref".

Subsequently, during the emission period, the first and second switching TFTs ST1 and ST2 are turned off. During the emission period, a gate-source voltage of the driving TFT DT is held by the storage capacitor Cst. During the emission period, a driving current proportional to a square root of "Vdata−Vref" flows through the driving TFT DT, and the OLED is emitted by the driving current.

Next, the operation of the pixel PIX for SDW driving will be described with reference to FIGS. 9 to 10C. The vertical blanking period VBP for SDW driving includes a setup period ① for setting the gate-source voltage of the driving TFT DT to fit to a sensing condition, a sensing period ② for sampling the pixel current, and a reset period ③ for resetting the gate-source voltage of the driving TFT DT to an emission period of IDW driving.

Referring to FIGS. 9 and 10A, during the setup period ①, the first switching TFT ST1 of the pixel PIX is turned on according to the scan signal SCT(n) for sensing to apply a data voltage VSDW to the gate electrode Ng of the driving TFT DT. During the setup period ①, the second switching TFT ST2 of the pixel PIX is turned on according to the scan signal SCT(n) for sensing to apply the reference voltage Vref to the source electrode Ns of the driving TFT DT. Accordingly, during to setup period ①, the gate-source voltage of the driving TFT DT is set to fit to the sensing condition.

Referring to FIGS. 9 and 10B, during the sensing period ②, the first switching TFT ST1 and the second switching TFT ST2 of the pixel PIX maintain a turned-on state. During the sensing period ②, the sensing circuit SU samples the pixel current input through the second switching TFT ST2 and the reference line RL.

Referring to FIGS. 9 and 10C, during the reset period ③, the first switching TFT ST1 and the second switching TFT ST2 of the pixel PIX maintain the turned-on state. During the reset period ③, a data voltage VREC for resetting is applied to the gate electrode Ng of the driving TFT DT and the reference voltage Vref is applied to the source electrode Ns of the driving TFT DT. The data voltage VREC for resetting may be the data voltage VIDW for image. During the reset period ③, the gate-source voltage of the driving TFT DT is reset to the emission period state of IDW driving.

As described above, according to the present disclosure, by further increasing the high-level power supply voltage applied to the pixel line selecting unit to be higher during sensing driving than that during display driving, the charge level for the Q node may be strengthened during sensing driving, thus ensuring desired gate output characteristics. In the present disclosure, since driving characteristics of the pixel is accurately sensed by securing desired gate output characteristics for sensing driving, compensation performance may be increased.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A gate driver, comprising:

a plurality of stages for outputting a gate signal for an image at a time of display driving, and outputting a gate signal for sensing at a time of sensing driving that follows the display driving, each of the plurality of stages including:

a first input terminal configured to receive a first high-potential power supply voltage having a first voltage level and a second voltage level;

a pixel line selecting unit configured to charge a first node with a first preceding stage carry signal based on a pixel line selection signal for a gate-on voltage during the display driving, and to charge a second node with the first voltage level of the first high-potential power supply voltage based on a sensing start signal for the gate-on voltage and a charged voltage of the first node during the sensing driving; and an output unit configured to output a scan clock for the gate-on voltage as the gate signal for sensing while the second node maintains a charged state on the sensing driving, wherein the first voltage level of the first high-potential power supply voltage is received at the first input terminal during the sensing driving, and the second voltage level of the first high-potential power supply voltage is received at the first input terminal during the display driving, and wherein the first voltage level is higher than the second voltage level.

2. The gate driver of claim 1, wherein the first voltage level of the first high-potential power supply voltage is lower than a break-down voltage of transistors electrically connected to the first input terminal.

3. The gate driver of claim 1, wherein each of the plurality of stages further includes:

an inverter unit configured to cut off electrical connection between a second input terminal that receives a second high-potential power supply voltage and a third node while the second node maintains the charged state on the sensing driving, wherein the first voltage level of the first high-potential power supply voltage is higher than the second high-potential power supply voltage, and wherein the second voltage level of the first high-potential power supply voltage is equal to or substantially equal to the second high-potential power supply voltage.

4. The gate driver of claim 3, wherein the second high-potential power supply voltage is the same at the times of the display driving and the sensing driving.

5. The gate driver of claim 3, wherein the pixel line selecting unit includes:

a first transistor;

a second transistor, the first transistor and the second transistor electrically connected in series between an input terminal that receives the first preceding stage carry signal and the first node, the first transistor and the second transistor configured to be concurrently turned on based on the pixel line selection signal;

a third transistor having a first electrode electrically connected to the first input terminal and a second electrode electrically connected between the first transistor and the second transistor, the third transistor configured to be turned on based on the charged voltage of the first node;

a fourth transistor having a first electrode electrically connected to the first input terminal, the fourth transistor configured to be turned on based on the charged voltage of the first node; and a fifth transistor having a first electrode electrically connected to a second electrode of the fourth transistor, and a second electrode electrically connected to the second node, the fifth transistor configured to be turned on based on the sensing start signal.

6. The gate driver of claim 5, wherein the pixel line selecting unit further includes:

a sixth transistor having a first electrode electrically connected to the second node, and a second electrode electrically connected to an input terminal that receives a low-potential power supply voltage, the sixth transistor configured to be turned on based on the sensing end signal of the gate-on voltage.

7. The gate driver of [one of] claim 3, wherein the inverter unit is configured to:

discharge the third node to a low-potential power supply voltage based on a second preceding stage carry signal having a phase of a gate-on voltage ahead of that of the first preceding stage carry signal during the display driving, discharge the third node to the low-potential power supply voltage based on a charged voltage of the second node during the display driving, charge the third node with the second high-potential power supply voltage according to a discharged voltage of the second node during the display driving, discharge the third node to the low-potential power supply voltage based on the sensing start signal and the charged voltage of the first node during the sensing driving, and discharge the third node to the low-potential power supply voltage based on the charged voltage of the second node during the sensing driving.

8. The gate driver of claim 7, wherein the inverter unit includes:

a first transistor having a first electrode electrically connected to the second input terminal, and a second electrode electrically connected to the third node;

a second transistor having a first electrode and a gate electrode electrically connected to the second input terminal, and a second electrode electrically connected to a gate electrode of the first transistor;

a third transistor having a first electrode electrically connected to the gate electrode of the first transistor, a second electrode electrically connected to the input terminal that receives the low-potential power supply voltage, and a gate electrode electrically connected to the second node;

a fourth transistor having a first electrode electrically connected to the third node, and a second electrode electrically connected to the input terminal that receives the low-potential power supply voltage, and a gate electrode electrically connected to the second node;

a fifth transistor having a first electrode electrically connected to the third node, a second electrode electrically connected to the input terminal that receives the low-potential power supply voltage, and a gate electrode to which the second preceding stage carry signal of the gate-on voltage is applied;

a sixth transistor having a first electrode electrically connected to the third node, and a gate electrode to which the sensing start signal is applied; and a seventh transistor having a first electrode electrically connected to a second electrode of the sixth transistor, and a second electrode electrically connected to the input terminal that receives the low-potential power supply voltage and a gate electrode electrically connected to the first node.

9. An organic light emitting display device comprising:

a gate driver including:

a plurality of stages for outputting a gate signal for an image at a time of display driving, and outputting a gate signal for sensing at a time of sensing driving that follows the display driving, each of the plurality of stages including:

a first input terminal configured to receive a first high-potential power supply voltage having a first voltage level and a second voltage level;

a pixel line selecting unit configured to charge a first node with a first preceding stage carry signal based on a pixel line selection signal for a gate-on voltage during the display driving, and to charge a second node with the first voltage level of the first high-potential power supply voltage based on a sensing start signal for the gate-on voltage and a charged voltage of the first node during the sensing driving; and an output unit configured to output a scan clock for the gate-on voltage as the gate signal for sensing while the second node maintains a charged state on the sensing driving, wherein the first voltage level of the first high-potential power supply voltage is received at the input terminal during the sensing driving, and the second voltage level of the first high-potential power supply voltage is received at the input terminal during the display driving, wherein the first voltage level is higher than the second voltage level; and a plurality of pixels electrically connected to the gate driver through gate lines, and driven based on the gate signal for the image and the gate signal for sensing.

10. A method for operating a gate driver including a plurality of stages for outputting a gate signal for an image at a time of display driving, and outputting a gate signal for sensing at a time of sensing driving that follows the display driving, the method comprising:

receiving a first high-potential power supply voltage having a first voltage level and a second voltage level at a first input terminal;

operating a pixel line selecting unit to charge a first node with a first preceding stage carry signal based on a pixel line selection signal for a gate-on voltage during the display driving, and to charge a second node with the first voltage level of the first high-potential power supply voltage based on a sensing start signal for the gate-on voltage and a charged voltage of the first node during the sensing driving; and operating an output unit to output a scan clock for a gate-on voltage as the gate signal for sensing while the second node maintains a charged state on the sensing driving, wherein the first voltage level of the first high-potential power supply voltage is received at the input terminal during the sensing driving, and the second voltage level of the first high-potential power supply voltage is received at the input terminal during the display driving, wherein the first voltage level is higher than the second voltage level.

11. The method of claim 10, wherein the first voltage level of the first high-potential power supply voltage is lower than a break-down voltage of transistors electrically connected to the first input terminal.

12. The method of claim 10, wherein each of the plurality of stages further includes:

operating an inverter unit to cut off electrical connection between a second input terminal that receives a second high-potential power supply voltage and a third node while the second node maintains the charged state on the sensing driving, wherein the first voltage level of the first high-potential power supply voltage is higher than the second high-potential power supply voltage, and wherein the second voltage level of the first high-potential power supply voltage is equal to or substantially equal to the second high-potential power supply voltage.

13. The method of claim 12, wherein the second high-potential power supply voltage is the same at the times of the display driving and the sensing driving.

14. The method of claim 13, wherein a gate-on voltage interval of the first preceding stage carry signal and a gate-on voltage interval of the pixel line selection signal are identical to each other.

15. The method of claim 14, wherein the inverter unit discharges the third node to a low-potential power supply voltage based on a second preceding stage carry signal having a phase of a gate-on voltage ahead of that of the first preceding stage carry signal during the display driving, discharges the third node to the low-potential power supply voltage based on a charged voltage of the second node during the display driving, charges the third node with the second high-potential power supply voltage based on a discharged voltage of the second node during the display driving, discharges the third node to the low-potential power supply voltage based on the sensing start signal and the charged voltage of the M node during the sensing driving, and discharges the third node to the low-potential power supply voltage based on the charged voltage of the second node during the sensing driving.

*16. A gate driver having a plurality of stages, each of the plurality of stages comprising:*

*a pixel line selecting circuit having a first input terminal configured to receive a first high-potential power supply voltage having a first voltage level and a second voltage level;*

*an output circuit configured to output a first gate signal for an image during display driving and to output a second gate signal for sensing during sensing driving,*

*wherein the first voltage level of the first high-potential power supply voltage is received at the first input terminal during the sensing driving and the second voltage level of the first high-potential power supply voltage is received at the first input terminal during the display driving, and*

*wherein the first voltage level is higher than the second voltage level.*

*17. The gate driver of claim 16, wherein the first voltage level of the first high-potential power supply voltage is lower than a break-down voltage of transistors connected to the first input terminal.*

*18. The gate driver of claim 16, wherein the pixel line selecting circuit charges a first node with a first preceding stage carry signal based at least in part on a pixel line selection signal for a gate-on voltage during the display driving, and charges a second node to a charged state with the first voltage level of the first high-potential power supply voltage based at least in part on a sensing start signal for the gate-on voltage and a charged voltage of the first node during the sensing driving.*

*19. The gate driver of claim 18, wherein each of the plurality of stages further includes:*

*an inverter circuit including a second input terminal and configured to cut off electrical connection between the second input terminal that receives a second high-potential power supply voltage and a third node while the second node maintains the charged state on the sensing driving.*

*20. The gate driver of claim 19, wherein at least part of the first high-potential power supply voltage is different from at least part of the second high-potential power supply voltage.*

*21. The gate driver of claim 19, wherein the first voltage level of the first high-potential power supply voltage is higher than the second high-potential power supply voltage, and*

*wherein the second voltage level of the first high-potential power supply voltage is equal to the second high-potential power supply voltage.*

*22. The gate driver of claim 19, wherein the second high-potential power supply voltage is the same during both the display driving and the sensing driving.*

*23. The gate driver of claim 18, wherein the pixel line selecting circuit includes:*

*a first transistor;*

*a second transistor, the first transistor and the second transistor connected in series between a third input terminal that receives the first preceding stage carry signal and the first node, the first transistor and the second transistor configured to be concurrently turned on based at least in part on the pixel line selection signal;*

*a third transistor having a first electrode connected to the first input terminal and a second electrode connected between the first transistor and the second transistor, the third transistor configured to be turned on based at least in part on the charged voltage of the first node;*

*a fourth transistor having a first electrode connected to the first input terminal, the fourth transistor configured to be turned on based at least in part on the charged voltage of the first node;*

*a fifth transistor having a first electrode connected to a second electrode of the fourth transistor, and a second electrode connected to the second node, the fifth transistor configured to be turned on based at least in part on the sensing start signal,*

*a sixth transistor having a first electrode connected to the second node, and a second electrode connected to a fourth input terminal that receives a low-potential power supply voltage, the sixth transistor configured to be turned on based at least in part on a sensing end signal of the gate-on voltage, and*

*a first capacitor connected to the first input terminal and the first node.*

*24. The gate driver of claim 23 wherein the first transistor is directly connected to the third terminal and the first and second transistor are directly connected in series to each other.*

*25. The gate driver of claim 23 wherein the second electrode of the third transistor is directly connected at a fourth node between the first transistor and the second transistor.*

*26. The gate driver of claim 19, wherein the inverter circuit is configured to:*

*discharge the third node to a low-potential power supply voltage based at least in part on a second preceding state carry signal having a phase of a gate-on voltage ahead of that of the first preceding stage carry signal during the display driving,*

*discharge the third node to the low-potential power supply voltage based at least in part on a charged voltage of the second node during the display driving,*

*charge the third node with the second high-potential power supply voltage according to a discharged voltage of the second node during the display driving,*

*discharge the third node to the low-potential power supply voltage based at least in part on the sensing start signal and the charged voltage of the first node during the sensing driving, and*

*discharge the third node to the low-potential power supply voltage based at least in part on the charged voltage of the second node during the sensing driving.*

*27. The gate driver of claim 26, wherein the inverter circuit includes:*

*a first transistor having a first electrode connected to the second input terminal, and a second electrode connected to the third node;*

*a second transistor having a first electrode and a gate electrode connected to the second input terminal, and a second electrode connected to a gate electrode of the first transistor;*

*a third transistor having a first electrode connected to the gate electrode of the first transistor, a second electrode connected to the input terminal that receives the low-potential power supply voltage, and a gate electrode connected to the second node;*

*a fourth transistor having a first electrode connected to the third node, and a second electrode connected to the input terminal that receives the low-potential power supply voltage, and a gate electrode connected to the second node;*

*a fifth transistor having a first electrode connected to the third node, a second electrode connected to the input terminal that receives the low-potential power supply voltage, and a gate electrode to which the second preceding stage carry signal of the gate-on voltage is applied;*

*a sixth transistor having a first electrode connected to the third node, and a gate electrode to which the sensing start signal is applied; and*

*a seventh transistor having a first electrode connected to a second electrode of the sixth transistor, and a second electrode connected to the input terminal that receives the low-potential power supply voltage and a gate electrode connected to the first node.*

*28. The gate driver of claim 27 wherein the first electrode and the gate electrode of the second transistor are directly connected to the second input terminal.*

*29. The gate driver of claim 27 wherein the second electrode of the second transistor is directly connected to the gate electrode of the first transistor.*

*30. The gate driver of claim 18, wherein the output circuit includes:*

*a first output node configured to output a current stage carry signal having a phase of a gate-on voltage later than that of the first preceding stage carry signal;*

*a first output transistor having a first electrode connected to a first clock input terminal that receives a carry clock for the gate-on voltage as the current stage carry signal, and a second electrode connected to the first output node;*

*a second output node configured to output the first gate signal;*

*a second output transistor having a first electrode connected to a second clock input terminal that receives a scan clock for the gate-on voltage as the first gate signal, and a second electrode connected to the second output node,*

*wherein a gate electrode of the first output transistor and a gate electrode of the second output transistor are connected to the second node.*

*31. The gate driver of claim 30, wherein the second output node configured to alternatively output the second gate signal.*

*32. The gate driver of claim 30 wherein the second output transistor has a first electrode connectable a second clock input terminal that receives a scan clock for the gate-on voltage as the second gate signal, and a second electrode connected to the second output node.*

*33. The gate driver of claim 30, wherein the output circuit further includes a second capacitor connected to the second node and the second output node.*

*34. The gate driver of claim 1, wherein the each of the plurality of stages includes a plurality of transistors, and*

*wherein at least one of the transistors includes an oxide semiconductor layer.*

*35. The gate driver of claim 16, wherein the first input terminal is part of the pixel line selecting circuit.*

*36. A gate driver having a plurality of stages, each of the plurality of stages comprising:*

*a pixel line selecting circuit including a first node and a second node;*

*a first input terminal configured to receive da first high-potential power supply voltage having a first voltage level and a second voltage level; and*

*an inverter circuit including a second input terminal and a third node, the inverter circuit configured to cut off electrical connection between the second input terminal that receives a second high-potential power supply voltage and the third node while the second node maintains a charged state on the sensing driving,*

*wherein the first voltage level of the first high-potential power supply voltage is received at the first input terminal during the sensing driving, and the second voltage level of the first high-potential power supply voltage is received at the first input terminal during the display driving,*

*wherein a third voltage level of the second high-potential power supply voltage is received at the second input terminal during the sensing driving, and a fourth voltage level of the second high-potential power supply voltage is received at the second input terminal during the display driving, and*

*wherein the first voltage level is higher than the second voltage level.*

*37. The gate driver of claim 36, wherein the first voltage level is different from the third voltage level during the sensing driving, and*

*wherein the second voltage level is the same as the fourth voltage level during the display driving.*

*38. The gate driver of claim 36, wherein the first voltage level is higher than the third voltage level at the time of the sensing driving, and*

*wherein the second voltage level is the same as the fourth voltage level at the time of the display driving.*

*39. An organic light emitting display device comprising:*

*a data driver;*

*a gate driver having a plurality of stages; and*

*a plurality of pixels connected to the data driver through data lines and reference lines, the pixels being connected to the gate driver through gate lines,*

*wherein at least one of the plurality of stages includes:*

*a pixel line selecting circuit having a first input terminal configured to receive a first high-potential power supply voltage having a first voltage level and a second voltage level;*

*an output circuit configured to output a first gate signal for an image during display driving and to output a second gate signal for sensing during sensing driving that follows the display driving,*

*wherein the first voltage level of the first high-potential power supply voltage is received at the first input terminal during the sensing driving, and the second*

*voltage level of the first high-potential power supply voltage is received at the first input terminal during the display driving, and*

*wherein the first voltage level is higher than the second voltage level.*

*40. The organic light emitting display device of claim 39, wherein the each of the plurality of stages includes a plurality of transistors, and*

*wherein at least one of the transistors includes an oxide semiconductor layer.*

*41. The organic light emitting display device of claim 39, wherein each of the plurality of pixels includes:*

*a driving transistor having a first electrode connected to a high-potential pixel voltage, a second electrode connected a source node and a gate electrode connected to a gate node;*

*a first switching transistor having a first electrode connected to one of the data lines, a second electrode connected the gate node, and a gate electrode connected to one of the gate lines;*

*a second switching transistor having a first electrode connected to the source node, a second electrode connected to one of the reference lines, and a gate electrode connected to one of the gate lines;*

*an organic light emitting having a first electrode connected to the source node, and a second electrode connected to a low-potential pixel voltage, and*

*a storage capacitor having a first electrode connected to the gate node, and a second electrode connected to the source node.*

*42. The organic light emitting display device of claim 19, wherein at least one of the first and second switching transistors includes an oxide semiconductor layer.*

*43. A gate driver, comprising:*

*a plurality of stages for outputting a gate signal for an image during display driving and outputting a gate signal for sensing during sensing driving, each of the plurality of stages including:*

*a first input terminal configured to receive a first high-potential power supply voltage having a first voltage level and a second voltage level;*

*a pixel line selecting circuit configured to charge a first node with a first preceding stage carry signal; and*

*an output unit configured to output a scan clock for the gate-on voltage,*

*wherein the first voltage level of the first high-potential power supply voltage is received at the first input terminal during the sensing driving, and the second voltage level of the first high-potential power supply voltage is received at the first input terminal during the display driving, and*

*wherein the first voltage level is higher than the second voltage level.*

*44. The gate driver of claim 43 wherein the pixel line selecting circuit is configured to charge the first node with the first preceding stage carry signal based on a pixel line selection signal for a gate-on voltage during the display driving.*

*45. The gate driver of claim 43 wherein the pixel line selecting circuit is configured to charge the second node with the first voltage level of the first high-potential power supply voltage based on a sensing start signal for the gate-on voltage and a charged voltage of the first node during the sensing driving.*

* * * * *